US009721777B1

(12) United States Patent
Muntean

(10) Patent No.: US 9,721,777 B1
(45) Date of Patent: Aug. 1, 2017

(54) MAGNETICALLY ASSISTED ELECTRON IMPACT ION SOURCE FOR MASS SPECTROMETRY

(71) Applicant: Bruker Daltonics, Inc., Billerica, MA (US)

(72) Inventor: Felician Muntean, Andover, MA (US)

( * ) Notice: Subject to any disclaimer, the term of this patent is extended or adjusted under 35 U.S.C. 154(b) by 0 days.

(21) Appl. No.: 15/099,054

(22) Filed: Apr. 14, 2016

(51) Int. Cl.
*H01J 49/10* (2006.01)
*H01J 49/26* (2006.01)
*G01N 30/72* (2006.01)
*H01J 49/14* (2006.01)
*H01J 49/34* (2006.01)

(52) U.S. Cl.
CPC ............ *H01J 49/147* (2013.01); *H01J 49/34* (2013.01)

(58) Field of Classification Search
USPC ........ 250/251, 281, 282, 288, 298, 310, 526
See application file for complete search history.

(56) References Cited

U.S. PATENT DOCUMENTS 6,617,771 B2 9/2003 Amirav
7,291,845 B2 * 11/2007 Moeller ................ H01J 49/147 250/423 R
8,525,106 B2 * 9/2013 Muntean ............. H01J 49/0481 250/281
8,759,758 B2 * 6/2014 Steiner ............... G01N 30/7206 250/288
9,117,617 B2 8/2015 Russ, IV et al.
9,401,266 B2 * 7/2016 Splendore ............. H01J 49/147
2006/0237641 A1 * 10/2006 Moeller ................ H01J 49/147 250/288
2012/0286150 A1 * 11/2012 Muntean ............... H01J 49/062 250/282
2013/0206978 A1 * 8/2013 Verenchikov ......... H01J 49/147 250/282
2013/0256523 A1 * 10/2013 Steiner ............... G01N 30/7206 250/282
2016/0027630 A1 * 1/2016 Splendore ............. H01J 27/205 250/427

OTHER PUBLICATIONS

Alderwick et al., Simulation and analysis of solenoidal ion sources, Review of Scientific Instruments, 79, 123301, 2008.

(Continued)

*Primary Examiner* — Bernard Souw
(74) *Attorney, Agent, or Firm* — Benoit & Côté Inc.

(57) ABSTRACT

The invention relates to a mass spectrometer having an electron impact ionization source which comprises an ejector for forming a beam of sample gas being driven in a first direction through an interaction region; a magnet assembly configured and arranged such that its magnetic field lines pass through the interaction region substantially parallel to the first direction; an electron emitter assembly for directing electrons toward the interaction region in a second direction being aligned substantially opposite to the first direction, wherein the electrons propagate along and are confined about the magnetic field lines until reaching the interaction region and forming sample gas ions therein; and a mass analyzer located downstream from the interaction region to which the sample gas ions are guided for mass analysis.

19 Claims, 8 Drawing Sheets

(56) References Cited

OTHER PUBLICATIONS

Ameziane et al., Insertion of an electron beam ionizer . . . , The European Physical Journal Applied Physics, AP 22, 231-235, 2003.
Carlston et al., High Efficiency LowPressure Ion Source, Review of Scientific Instruments, 33, 905, 1962.
Dekieviet et al., Design and performance of a highly efficient mass spectrometer for molecular beams, Review of Scientific Instruments, 71, 5, May 2000.
Martens et al., Development of a permanent magnet alternative for a solenoidal ion source, Nuclear Instruments and Methods in Physics Research B 340, 85-89, 2014.
Kalinin et al., Ion Source with Longitudinal Ionization of a Molecular Beam by an Electron Beam in a Magnetic Field, Instruments and Experimental Techniques, 49, 5, 2006.
Park et al., Effect of magnetic field in electron-impact ion sources and simulation of electron trajectories, Review of Scientific Instruments, 77, 085107, 2006.
Yue et al., Electron Ionization in Superimposed Magnetic and Radio Frequency Quadrupolar Electric Fields, Analytical Chemistry, 77, 13, Jul. 2005.
Yue et al., Superimposition of a Magnetic Field around an Ion Guide for Electron Ionization Time-of-Flight Mass Spectrometry, Analytical Chemistry, 77, 13, Jul. 2005.

* cited by examiner

MAGNETICALLY ASSISTED ELECTRON IMPACT ION SOURCE FOR MASS SPECTROMETRY

BACKGROUND OF THE INVENTION

Field of the Invention

The invention relates to electron impact ion sources for use in mass spectrometers, particularly in benchtop mass spectrometers, e.g. gas-chromatograph/mass-spectrometers (GCMS).

Description of the Related Art

Usually, gas-chromatograph/mass-spectrometer instruments use electron impact (EI) sources to create ions. In the most common prior art (see FIG. 1) the sample is vaporized in the GC and introduced into the source where the sample molecules are effusing from the end of a GC column (41) and bounce on the inside walls of the ionization chamber (40) creating a transient local pressure before they diffuse through the source openings and are pumped away. The EI source uses a filament assembly (42) with a straight filament that generates electrons, which are accelerated to typically seventy electron volts toward the ionization region where they collide with sample molecules and ionize. The electrons can be guided by a magnet assembly comprising two magnets (46) and (47) and a magnetic yoke (48). The ions are extracted from the ion source housing (40) by apertured electrodes (44) and form an ion beam (45). The source operates in high vacuum, at pressures lower than one Pascal, such as $10^{-2}$ Pascal or even less, so that the ionization occurs under conditions where the mean free path is larger than typical dimensions of the source.

Electron impact cross sections are very small and in a typical EI source several measures are commonly taken to improve ionization efficiency.

By way of example, U.S. Pat. No. 9,117,617 B2 (Agilent Technologies, Inc., Santa Clara, Calif. (US), Charles William Russ, IV, Harry F. Prest, Jeffrey T. Kernan, "Axial Magnetic Ion Source and related Ionization Methods"; filed Jun. 24, 2013) uses an axial alignment of the electron path and ion extraction path which increases the ion extraction efficiency of the EI source. Nevertheless, the ionization area is still limited to a narrow confined space along the axis of the source while the sample molecules are introduced at right angle to the electron path and spread through the entire source volume. So the ionization efficiency is still relatively small.

Another prior art technique, described in U.S. Pat. No. 6,617,771 B2 (Aviv Amirav "Electron Ionization Ion Source", filed Jan. 24, 2002), introduces the sample into the source as a confined supersonic jet through a nozzle-skimmer arrangement, followed by cross beam electron ionization (see FIG. 2). One advantage is that the sample is now confined into a narrow jet volume. Another advantage is that the sample molecules do not hit any source walls, thus eliminating some disadvantages of the generic EI source as exemplarily illustrated in FIG. 1. Electron ionization is achieved by an electron curtain coming from a long filament oriented parallel with the neutral sample gas jet. The disadvantage is poor ionization efficiency due to the poor electron beam confinement and single pass of the emitted electrons through the sample jet. As a result, very large electron emission currents need to be used which leads to filament deformation in time and heat management complications.

Yet another prior art technique is presented in FIG. 3, schematically depicting the ion source by M. DeKieviet et al. "Design and performance of a highly efficient mass spectrometer for molecular beams"; Review of Scientific Instruments, May 2000; vol. 71, No. 5. DeKieviet et al. also introduce the sample as a confined gas jet (51) followed by electron impact ionization, but the electron beam (56) from a ring filament assembly (50) is focused and aligned with the jet area by a magnetic field (55) generated by a solenoid magnet (52) downstream of the ring filament. The electrons are generated off-axis, within the fringe field of a solenoidal magnet, and then accelerated toward the axis of the source where the sample jet (51) flows. Acceleration occurs along the magnetic field lines such that the electrons (56) spiral there-around at radii becoming ever smaller as they get closer to the axis where the field is denser.

This configuration has some advantages: it confines the neutral sample into the area of a jet and then it confines the electrons into the same area using the solenoidal magnetic field such that ionization and ion extraction can have high efficiency. One disadvantage would be the large current required for the solenoid to generate the necessary strong magnetic field, which requires significant cooling and limits the application of this source to large-dimension, high power instruments. This basically excludes the use of this source in the typical GCMS where benchtop instruments are the norm and actually largely demanded by customers. Another disadvantage would be the creation of a sort of "magnetic trap" on the gas jet path inside the solenoid body where a large number of electrons could accumulate over time ultimately leading to space charge issues.

In view of the foregoing, there is still a need for a small, high efficiency electron impact ion source for mass spectrometry, particularly for GCMS instrumentation.

SUMMARY OF THE INVENTION

This disclosure proposes a mass spectrometer having an electron impact ionization (EI) source which can particularly link a gas chromatograph and a subsequent mass analyzer. The EI source comprises an ejector for forming a beam of sample gas that is driven in a first direction through an interaction region (where the gas beam and the electron beam penetrate each other). A magnet assembly is configured and arranged such that its magnetic field lines pass through the interaction region substantially parallel to the first direction. Further there is an electron emitter assembly, such as a filament assembly or nanotube assembly, for directing electrons toward the interaction region in a second direction that is aligned substantially opposite to the first direction. The electrons propagate along and are confined about the magnetic field lines until they reach the interaction region and form sample gas ions therein. There is also foreseen a mass analyzer downstream from the interaction region (as well as downstream from the electron emitter assembly) to which the sample gas ions are guided for mass analysis.

A skilled practitioner in the field will appreciate that opposite alignment of the first direction (gas beam direction) and second direction (direction of electron propagation) may encompass angles between about 120 degrees and 240 degrees, preferably between about 135 and 225 degrees, further preferably between about 157.5 degrees and 202.5 degrees, wherein 180 degrees would indicate a direct head-on counter flow arrangement while zero degrees means concordant directions of motion of sample gas molecules in the beam and electrons.

When the electrons enter the beam of gas molecules substantially head-on, a first portion thereof will start ionizing the gas molecules and, as a result, be slowed down and scattered laterally from the central gas beam to much larger orbits around the magnetic field lines, while a second portion that is still unreacted will penetrate yet deeper into the gas beam. Due to the counter flow, the latter portion of unreacted electrons enters an upstream region of gas molecules in the beam that has likewise not been reacted, as a consequence of which the likelihood of ionization regarding the initial plurality of electrons is increased.

A notable difference to the concordant flow arrangements as advocated, for instance, by DeKieviet et al. is that the second portion of unreacted electrons is carried along with, and thereby remains in parts of, the gas beam in which some gas molecules have already been ionized. Since a second interaction of an already-ionized molecule with an electron does not contribute further to the overall ionization, the counter flow arrangement as suggested in this disclosure increases the ionization efficiency by making better use of the electrons. As the electron impact ion source according to the invention employs the far fringe field of a magnet for guiding the electrons to the interaction region, there is no substantial risk of generating a "magnetic trap" where electrons would accumulate, create a region of space charge, and adversely influence the motion of the sample gas ions generated in the gas beam.

Since an electron emitter, such as a filament, usually emits electrons multi-directionally, it goes without saying that the EI source may be complemented with a suitable repeller electrode-focusing lens assembly positioned adjacent the electron emitter in order to ensure that the electrons are guided in the desired second direction running substantially counter to the direction of propagation of the gas beam (first direction). It is therefore preferable to locate the gas ejector and the electron emitter assembly at opposite sides of the interaction region along the first direction.

In various embodiments, the magnet assembly may have annular shape and may be disposed concentrically about the ejector. In one variant, the magnet assembly can comprise an annular permanent magnet that is magnetized radially. In other variants, the magnet assembly may comprise a plurality of axially magnetized permanent magnets, such as bar magnets, which are arranged concentrically in a hub-and-spikes pattern around the ejector. Preferably, the interaction region is located in a fringe field of, and downstream from, the magnet assembly. It is further preferable to locate the magnet assembly and the electron emitter assembly at opposite sides of the interaction region along the first direction.

In various embodiments, the magnet assembly can be designed and configured such that its magnetic field lines converge in the interaction region against the first direction to establish a magnetic bottle effect that reflects the incoming electrons. In so doing, electrons that have not interacted with the molecules in the gas beam in their first counter flow pass through the gas beam may obtain a second chance of doing so when they are reflected and pass the gas beam for a second time in a concordant flow direction.

In other embodiments, the magnet assembly may comprise an axially magnetized magnet, such as a solid or hollow cylindrical magnet, that is located behind, and aligned coaxially with the ejector. For example, axially magnetized bar magnets are readily available on the market which simplifies the production of such ion source and renders it more economic.

A skilled practitioner will appreciate that the strength or amplitude of the magnetic field is preferably chosen such as to ensure that only the trajectories of the comparatively light electrons (approximately 1/1836 of an atomic mass unit) are affected by it whereas the motion of the sample gas ions generated by means of the interaction with the electrons (usually several tens to several thousand atomic mass units) remains largely undeflected. By way of example, field strengths of about $10^{-3}$ to 0.1 Tesla, such as $10^{-2}$ Tesla, in and around the interaction region would generally be suitable for this purpose.

In various embodiments, a wall may separate different vacuum stages between the ejector and the interaction region. The wall may have an opening that is located substantially opposite the ejector. In so doing, a proportion of the neutral molecules contributing to the total gas load and potentially prematurely quenching the electrons can be removed before reaching the interaction region. Further, the opening assists in forming a well-defined gas beam at the downstream side thereof ready to be exposed to the electrons. In one variant, the wall can comprise a conical skimmer having an apertured apex that is pointing toward the ejector, thereby helping to remove excess gas laterally and form a well-defined narrow gas beam which, in turn, helps preventing the ejected sample gas molecules from hitting surfaces in the ion source that could lead to contamination.

In various embodiments, the electron emitter assembly can comprise a filament ring or coil and a repeller electrode-focusing lens assembly dimensionally adapted thereto, both the filament ring or coil and the repeller electrode-focusing lens assembly being disposed concentrically about the first direction. A filament ring allows the production and direction of electrons toward the interaction region from a full 360 degrees solid angle, increasing the electron density and thereby the likelihood of electron-gas molecule interaction.

In other embodiments, the electron emitter assembly may comprise one or more (individual) filaments and associated repeller electrode-focusing lens assemblies that are located laterally displaced from the first direction. If more than one linear filament or coil filament is used, it is preferable to locate them in a rotationally symmetric arrangement around the first direction. For example, two filaments could be located diametrically opposite about the first direction; three filaments could be positioned equi-angularly (at intervals of 120 degrees) about, and at equal distances from the first direction, etc. Using a plurality of individual filaments, while making the set-up slightly more complicated, can improve robustness of the ion source, because failure of one of the individual filaments, such as due to thermal or mechanical stress, would still leave the remaining individual filaments operable whereas failure of a single annular filament, for instance, would necessitate its replacement before the operation of the ion source could continue. The same argument would apply if the individual filaments were replaced by other individual electron emitters, such as individual nanotube emitters.

In principle, continuous operation of the electron emitter assembly is the preferred operation mode of the ion source such that electrons are constantly emitted over time. However, in some embodiments it may be useful to arrange for a pulsed operation of the electron emitter assembly including alternate phases of electron emission and no such emission, if it suits the application.

In various embodiments, the ejector may comprise one of a nozzle and an aperture. In some embodiments, the nozzle can be configured to generate a supersonic beam of sample gas. In so doing, fraying of the beam of gas molecules and thereby laterally losing analyte molecules of interest can be prevented to a large degree. In some cases, the forming of a supersonic gas jet might render the division of the source volume into separate vacuum stages dispensable.

In various embodiments, the ejector can be coupled upstream to an output of a gas chromatograph, the eluent of which is then analyzed in the mass analyzer. Generally, the mass analyzer may be taken from the group comprising quadrupole mass filters, triple-quadrupole mass analyzers, ion trap mass analyzers, time-of-flight mass analyzers, Fourier Transform (ion cyclotron resonance) mass analyzers or the like.

In various embodiments, a radio frequency (RF) ion guide or ion funnel may be located between the interaction region and the mass analyzer for guiding the sample gas ions to the mass analyzer. In so doing, it can be ensured that a high number of generated ions is sampled and measured in the subsequent mass analyzer. Preferably, the ion guide or ion funnel is constructed such that (unreacted) excess gas can be separated from the remaining sample gas ions, for instance, by providing for a non-linear ion passage therein.

In various embodiments, an interface (such as a divider wall) can be foreseen between the interaction region and the mass analyzer so that the two are located in different vacuum stages and pressure regimes.

BRIEF DESCRIPTION OF THE DRAWINGS

The general principles of the invention will now be described with reference to the following figures which are, however, largely not drawn to scale but often illustrate the invention schematically.

DETAILED DESCRIPTION

While the invention has been shown and described with reference to a number of different embodiments thereof, it will be recognized by those skilled in the art that various changes in form and detail may be made herein without departing from the scope of the invention as defined by the appended claims.

Figure 1:
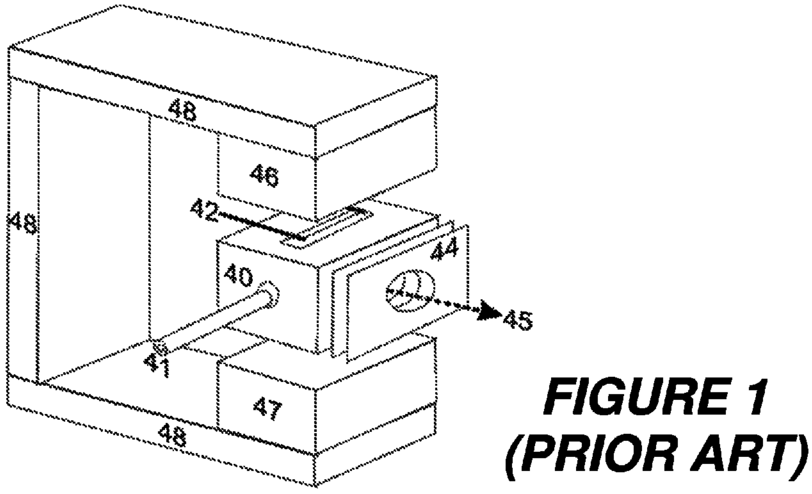
FIGURE 1 (PRIOR ART)
FIG. 1 presents a generic magnetically assisted electron impact ion source. Sample gas is blown through capillary (41) into the ion source housing (40). A filament assembly (42) with a straight filament emits electrons which are accelerated to about seventy electron volts and are guided by the magnetic field of the magnet assembly with magnets (46) and (47), and magnetic yoke (48) into the ion source housing (40). Ionized sample gas molecules are extracted by apertured electrodes (44) and formed into an ion beam (45).
Figure 2:
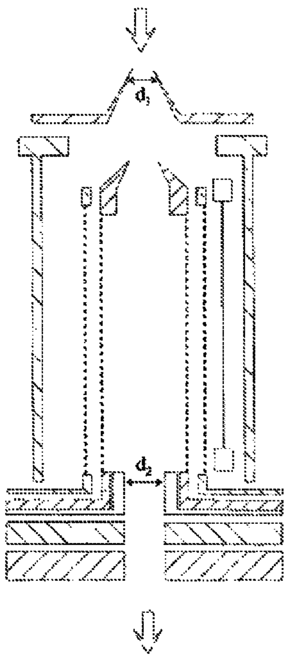
FIGURE 2 (PRIOR ART)
FIG. 2 shows a cross-flow molecular beam electron impact ion source devised by Aviv Amirav, as evident from U.S. Pat. No. 6,617,771 B2.
Figure 3:
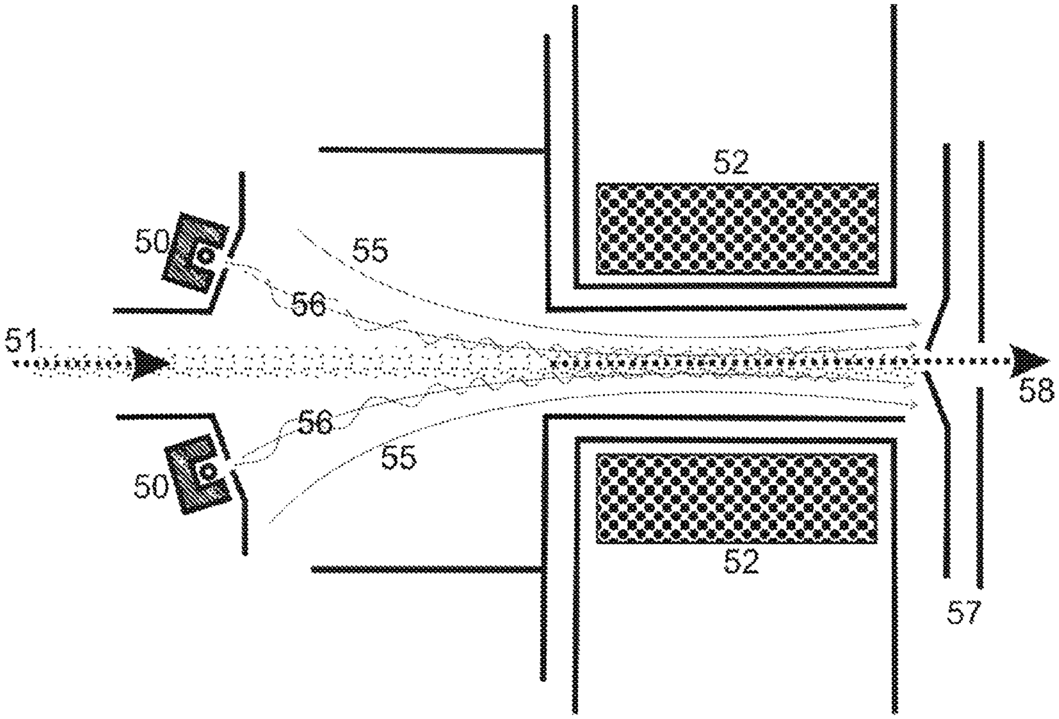
FIGURE 3 (PRIOR ART)
FIG. 3 schematically illustrates the ion source by DeKieviet et al. A gas jet (51) is directed into and through the bore of an electromagnet with solenoid (52). An electron source assembly (50) with ring emitter emits and accelerates electrons (56) which follow the field lines (55) of the magnetic field, entering the sample gas jet in the center of the magnet. The ions are extracted by electrodes (57) and formed to an ion beam (58).
Figure 4:
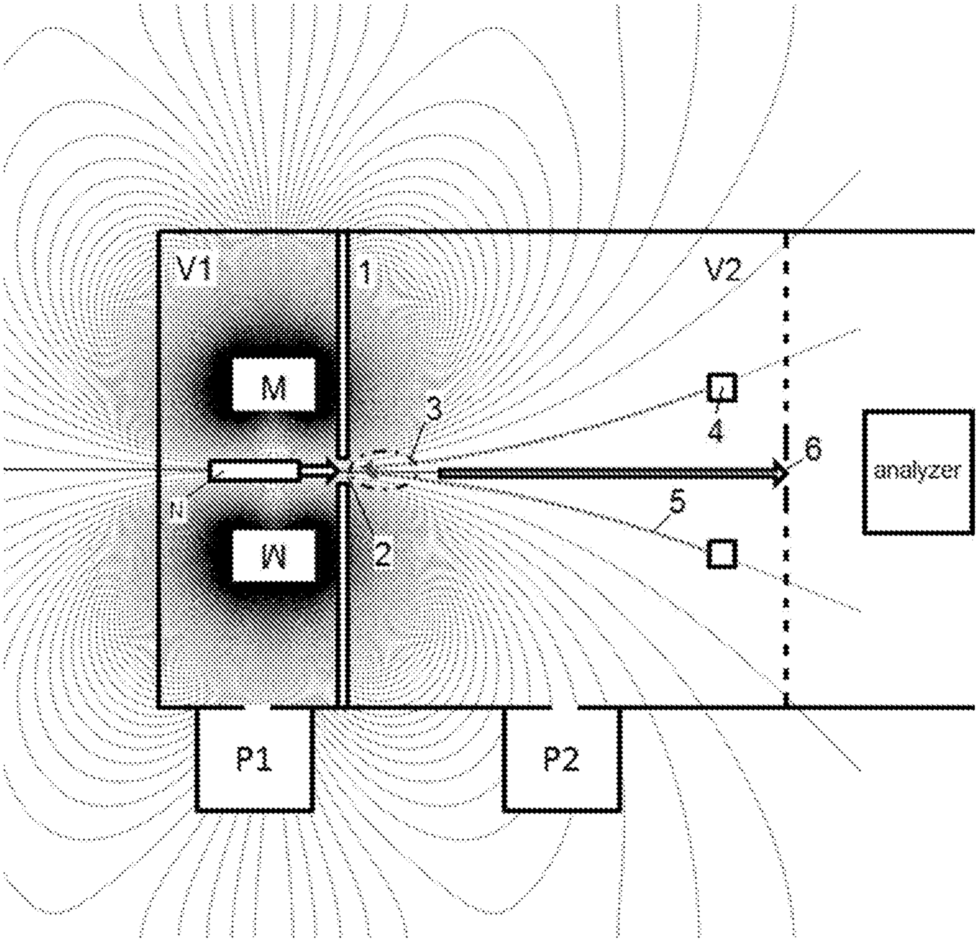
FIG. 4 shows schematically a first embodiment of a magnetically assisted electron impact ion source for mass spectrometry having a counter flow arrangement according to principles of the invention.

FIG. 4 shows schematically a first embodiment of a magnetically assisted electron impact ion source for mass spectrometry according to principles of the invention. The source basically comprises two adjacent vacuum stages V1, V2, each being pumped down to the desired pressure by vacuum pumps indicated as P1 and P2. Suitable operating pressures could be $\leq 10^{-1}$ Pascal in V1 and $\leq 10^{-3}$ Pascal in V2, by way of example. The different pressure regimes are separated by a divider wall (1) that has a small opening (2) at its center. A gas nozzle N as ejector is located in the first vacuum stage V1, the tip of which points towards the wall opening (2). The nozzle N may be supplied with the eluent from a gas chromatograph, for example. A gas beam (arrow) is formed by the eluent upon exiting the nozzle N which largely passes through the opening (2) into the second vacuum stage V2, while a portion of the gas will be deflected by the rim around the wall opening (2) and pumped off. The nozzle N is commonly operated at elevated temperatures, such as between 100 and 400 degrees centigrade, preferably between 200 and 300 degrees centigrade.

An annular, radially magnetized magnet M is located in the first vacuum stage V1 such that the nozzle N is situated within the annular aperture slightly set back from the forward edge of the magnet M. However, other relative positions of magnet M and nozzle N than that depicted are also conceivable. The magnet M can be composed of a series of bar magnets bonded to one another in an annular arrangement ("hub-and-spikes" arrangement), as will be described further below.

FIG. 4 also illustrates the magnetic field lines emanating from and returning to such magnet M. Since the opposing surfaces at the inner circumference of the magnet M feature the like direction of magnetization, the field lines in the interior are compressed into a comparatively dense state except in a position directly at the center of the magnet's ring aperture. Along the axis of the magnet M (running from left to right in the illustration), between a position at the ring magnet's center and outside further away from the magnet M, a magnetic fringe field is established where adjacent field lines converge, thereby forming a magnetic constriction that could be called a "magnetic bottle". At least parts of this region of highest magnetic field line density are well-suited to function as interaction region (3; dash-dotted contour) for neutral molecules in the gas beam and incoming electrons, as will become apparent from the description further below. It goes without saying that the boundary materials of the two vacuum stages V1, V2 in the present example, including the wall (1), are advantageously chosen such as to not fundamentally distort the magnetic field created by the magnet M.

The second vacuum stage V2 encompasses an electron emitter that is represented schematically in FIG. 4 by the two squares (4) for the ease of illustration. The squares (4) may represent an assembly having an annular filament and associated dimensionally adapted toroidal repeller electrode-focusing lens assembly for accelerating the electrons (5) that are emitted multi-directionally in the desired second direction running substantially counter to the direction of propagation of the gas beam (first direction). By way of example, the annular filament could be divided electrically into a plurality of individually supported segments and take the form as set out in co-pending U.S. patent application Ser. No. 14/341,076 that is to be incorporated into the present disclosure by reference in its entirety. In the illustrated example, the angular deviation of the squares (4) from the central axis, as seen from the center of the interaction region (3), would amount to about twelve degrees, or in other words, the first direction and the second direction would be aligned at an angle of about 168 degrees (upper square) and 192 degrees (lower square), respectively.

In other variants, departing from an annular design of the electron emitter assembly, the two squares (4) might also represent a plurality of individual filaments, such as linear or coiled filaments, that are positioned symmetrically about the direction of gas beam propagation. Each such filament might have its own associated repeller electrode-focusing lens assembly, as the case may be. As can be seen, the magnetic field lines at the position of the electron emitter(s) run in comparatively large arches before converging in a position just outside the magnet's ring aperture near the wall opening (2). Initially, the electrons (5) emitted by the filament(s), regardless of their exact shape, are accelerated to a kinetic energy of typically seventy electron volts in a direction substantially parallel to one of the magnetic field lines; in other words, a direction that is initially bound to intersect the central axis of the ion source which coincides with the magnetic axis. However, when the field lines start to bend their path into alignment with the central axis of the annular magnet M, the electrons begin to follow this curvature in a spiraling trajectory there-around by virtue of the Lorentz force. In this manner, the electrons (5) are directed to penetrate the beam of gas molecules substantially head-on as a result of which electron ionization occurs within the interaction region (3).

As already explained above, in the present example, the annular magnet M forms a three-dimensional magnetic constriction near the opening (2) in the wall (1) whereby electrons that have not been interacted with sample gas molecules in the interaction region (3) will be decelerated to a standstill at least in the direction counter to the first gas beam direction and finally reflected back. In so doing, these electrons obtain a second chance of interacting with molecules in the gas beam if the first counter flow pass through the gas beam was not successful. The sample gas ions generated in the interaction region (3) may pass on (arrow 6) to a mass analysis region in which a suitable mass analyzer, such as a mass filter or ion trap mass analyzer, is situated. The mass analyzer could be located (i) in the same vacuum stage V2 as the electron emitter assembly (4) and the interaction region (3) or (ii) beyond a boundary (indicated by rightmost dashed contour) of the second vacuum stage wherein the ions are sampled through an aperture into a separate mass analysis region, being kept at very low pressure, where the mass analyzer would then be situated.

Figure 5:
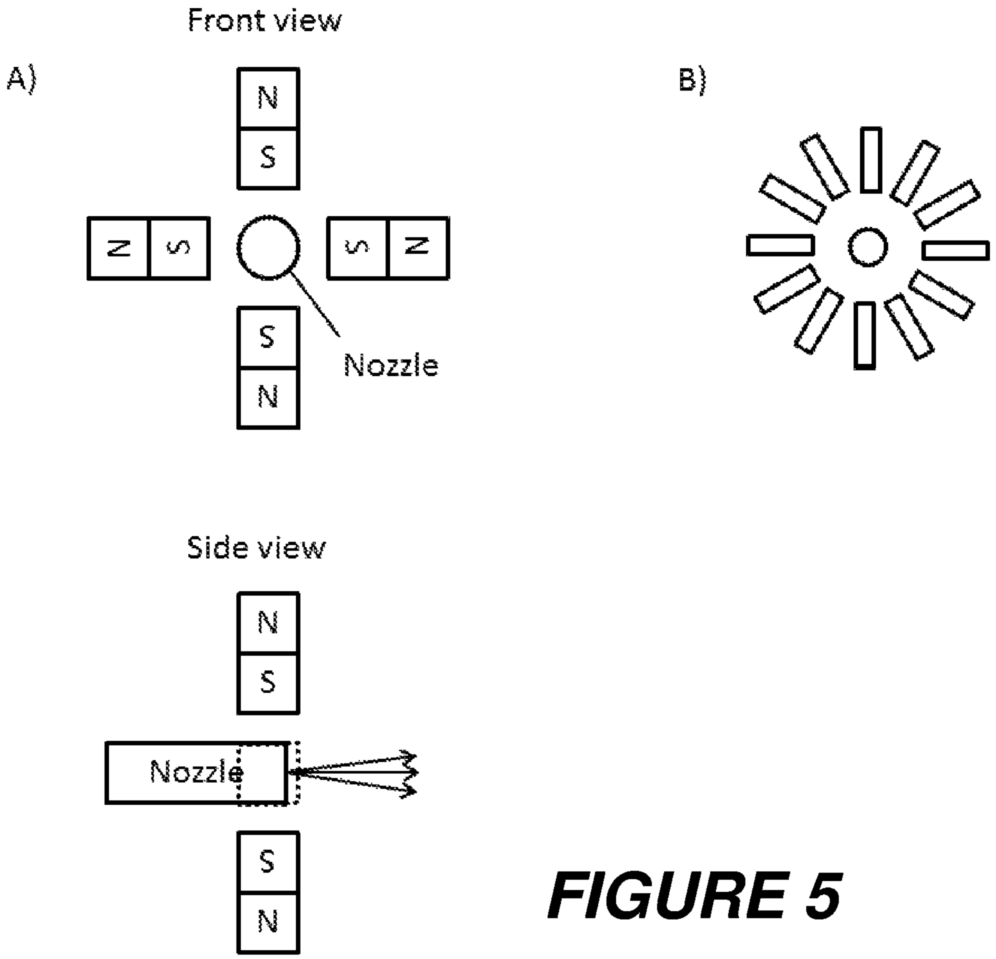
FIG. 5 shows schematically a suitable construction principle for an annular, radially magnetized permanent magnet.

FIG. 5 shows schematically how an annular, radially magnetized permanent magnet can be approximated by a plurality of axially magnetized permanent bar magnets. The left panel A) of FIG. 5 depicts four axially magnetized bar magnets that symmetrically surround, and are pointing to the central nozzle in a front view (top) and side view (bottom). The polarity of the bar magnets is indicated by way of example only and could also be reversed. As a consequence of the bar magnets not covering a complete 360 degrees annulus, the resultant magnetic field will also not be perfectly rotationally symmetric but features certain distortions in the interstitial gaps (which may be filled with non-magnetic or further magnetic material to complete the ring shape for mounting purposes). However, the present invention employs the magnetic field lines in the far fringe field of such magnet where interstitial distortions, if any, become less and less significant as a relative contribution to the overall field.

The right panel B) of FIG. 5 illustrates an embodiment of an annular, radially magnetized permanent magnet that is composed of a yet larger number of axially magnetized bar magnets (here twelve) while still exploiting the same construction principle as shown in panel A). A person skilled in the pertinent art will appreciate that, using this construction principle, the more bar magnets are arranged on a ring, the better a perfect annular magnet will be approximated.

Figure 6:
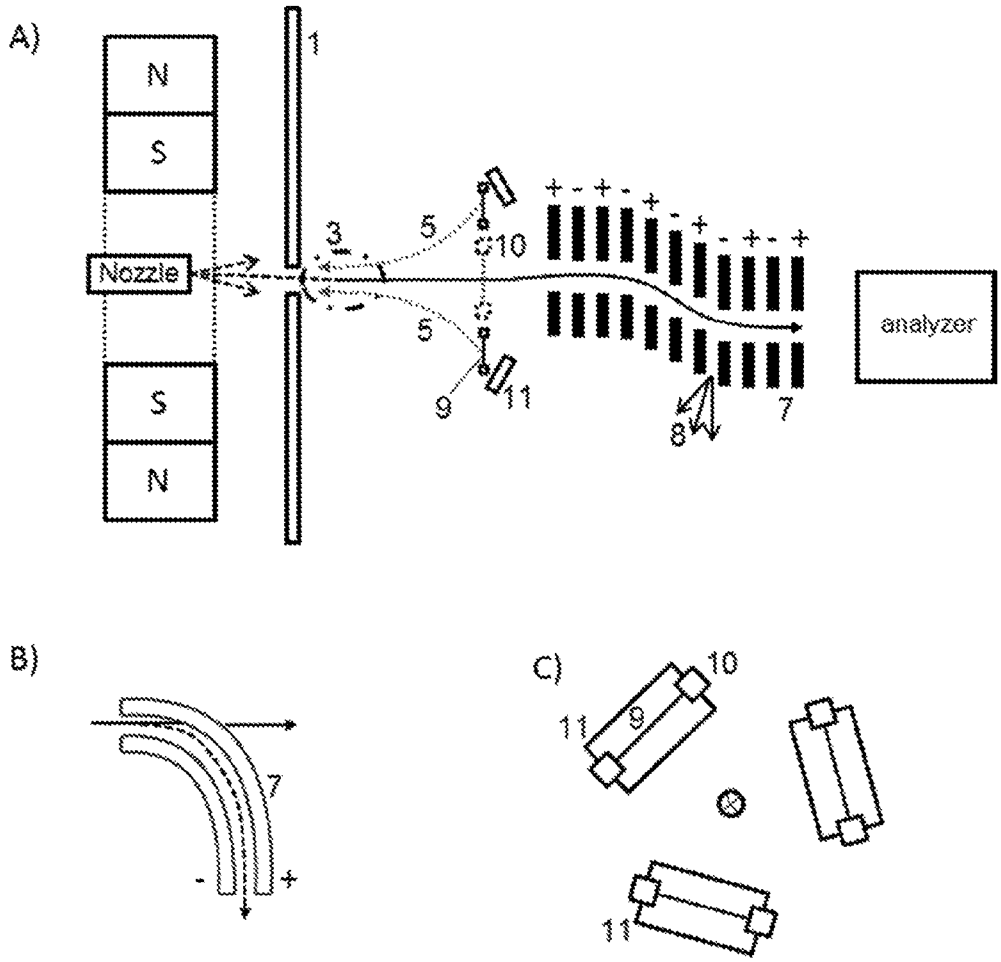
FIG. 6 shows some variations in the basic embodiment of the magnetically assisted electron impact ion source for mass spectrometry having a counter flow arrangement presented in FIG. 4.

At the top of FIG. 6, panel A) shows a variant of the first embodiment in a slightly simplified illustration. The magnetic field lines, for example, as well as the outer boundaries of the vacuum stages are omitted. A notable difference to the embodiment of FIG. 4 is the presence of a radio frequency ion guide (7) in the second vacuum stage at a position downstream from the filament assembly and upstream from a mass analyzer (not illustrated), which will be scrutinized in a little more detail below.

The RF ion guide (7) in the present example is made up of a series of stacked electrode plates that have a central aperture for ion passage at their center. Alternate supply of two phases of a radio frequency voltage to adjacent electrode plates, as indicated by the (+) and (−) signs, allows for the generation of an ion tube or ion tunnel which prevents charged particles from colliding with the electrode plates and escaping through the gaps there-between. The apertures in the electrode plates are depicted as having uniform size. A skilled practitioner will recognize, however, that the apertures could become gradually smaller over the length of the RF ion guide, thereby forming a well-known ion funnel which provides for better axial focusing of the sample gas ions and could assist in their transmission into the analysis region.

The entrance of the RF ion guide (7) is generally aligned with the direction of motion of the gas beam generated by the nozzle on the other side of the divider wall (1) that will largely coincide with the direction of motion of the sample gas ions that have been generated in the interaction region (3) by the exposure to the incoming electrons (5). The exit of the RF ion guide discharges into an analysis region where a suitable mass analyzer is placed (either in the same vacuum stage or in a separate vacuum stage). As can be seen, entrance and exit of the RF ion guide (7) are slightly offset from one another by virtue of a curved, non-linear central passage. Sample gas ions that are confined by the oscillating electric fields in the RF ion guide (7) will pass through the apertures in the electrode plates, as the case may be assisted by a direct current voltage gradient established from the entrance to the exit. Gas molecules in the gas beam that remain neutral after having passed the interaction region (3), on the other hand, are not so confined, will sooner or later hit one of the electrode plates and be diffused. The diffused gas can leave the interior of the RF ion guide (7) through the gaps between the electrode plates, as indicated by the arrows (8), and then be pumped off. In so doing, the background noise on the ion detector coupled to the mass analyzer can be reduced or eliminated completely.

Panel B) of FIG. 6, bottom left, depicts a further variant of an RF ion guide (7) that is composed of a plurality of parallel rods arranged symmetrically about a central axis, well known to a practitioner in the field under the name of multipole ion guide. Common implementations include quadrupole ion guides, hexapole ion guides, octopole ion guides, etc. The rods have a curvature of 90 degrees in the illustrated example which means that the sample gas ions exit the ion guide along an axis that is aligned at right angle with the axis of incidence into the ion guide (dashed arrow). As has been described before, neutral gas molecules are not subject to the confining effect of the RF oscillating electric fields and will just pass straight through the gaps between the rods (solid arrow). In this manner, efficient separation of neutral and charged molecules can be achieved. It goes without saying that the analysis region comprising the mass analyzer would have to be relocated to a position opposite the exit of the curved RF ion guide (7).

Panel C) of FIG. 6, bottom right, shows the filament assembly of panel A), which departs from the use of an annular filament as in the embodiment of FIG. 4, in a little more detail. While panel A) presents a side view, panel C) changes the perspective to a front view, along the central axis of the ion source which coincides with the direction of the gas beam (first direction) as well as that of the annular magnetic symmetry. The assembly here comprises three linear filaments (9) each mounted between two square filament holders (10) which may also function as the electric supply contact. The individual filaments (9) are located symmetrically around the gas beam direction. Repeller electrodes (11) accelerating the electrons (5) in the counter flow direction are indicated behind the filaments (9).

A skilled practitioner will understand that the presence of three filaments (9) in this embodiment is given by way of example only and not to be construed limitatively. Two, four or even more individual filaments laterally spaced apart from the gas beam direction would also be feasible. Even the axial position of individual filaments along the first gas beam direction could be varied individually, if that was found expedient by a person skilled in the pertinent art, as long as the emitted electrons are introduced reliably into the far fringe field of the magnet so that they can be guided thereby to the interaction region (3). It goes further without saying that the linear filaments (9) could be easily replaced by filaments of other shapes, such as coiled filaments, for instance. Filaments could also be replaced by other electron emitting devices, such as nanotube emitters. The disclosure is not to be construed restrictively in this regard.

Figure 7:
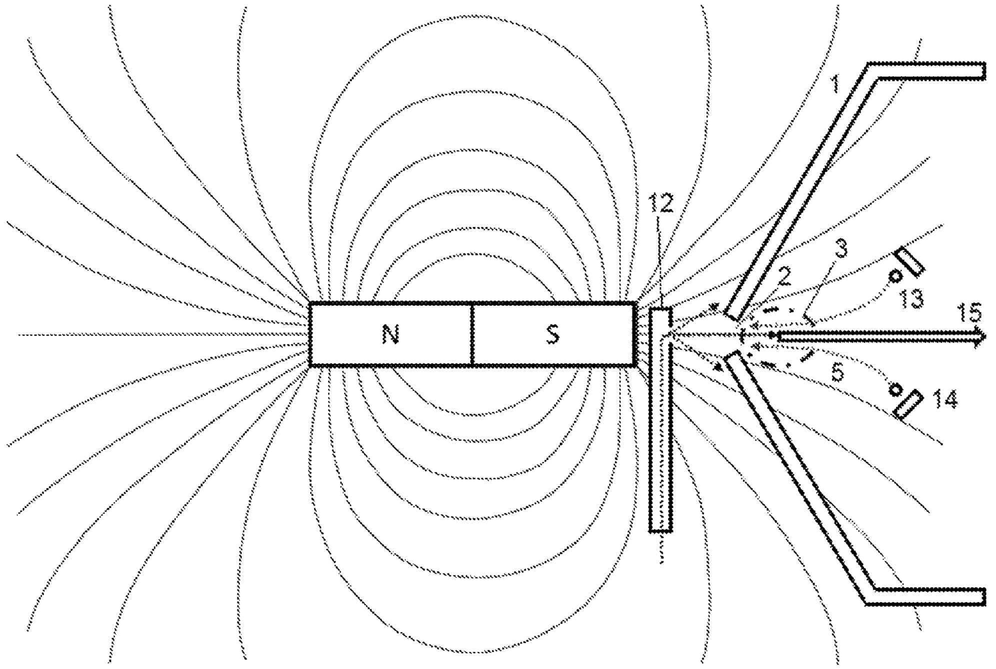
FIG. 7 shows schematically a further embodiment of a magnetically assisted electron impact ion source for mass spectrometry having a counter flow arrangement according to principles of the invention.

FIG. 7 shows schematically a further embodiment of a magnetically assisted electron impact ion source for mass spectrometry according to principles of the invention. This embodiment features a single axially magnetized permanent bar magnet which is generally aligned with the overall axis of the ion source (running from left to right in the illustration). The North N and South S poles of the permanent magnet are indicated, though it would be possible to use the reverse alignment without affecting the source's operability. The magnetic field lines emanate from one of the poles and return to the magnet at the respective other pole. A gas ejector (12) is located in front of the front face of the S pole discharging the sample gas on-axis through a suitable opening in a first direction facing away from the S pole of the magnet. As can be seen, this arrangement may require a lateral supply of the sample gas to the ejector (12). However, a skilled practitioner will recognize that it would also be conceivable to provide the axially magnetized bar magnet with a central bore in which an on-axis gas supply could be located.

The sample gas is ejected toward an opening (2) in a divider wall (1) which, in the present example, is slightly conical and acts as a gas skimmer. In other words, those parts of the sample gas that are ejected at large angles impinge on the rim parts around the central opening (2) at the apex of the skimmer, are deflected and pumped off by a pump which is not shown in the present illustration. The sample gas passing through the opening (2) in the skimmer, on the other hand, is shaped into a narrow gas beam that is guided through an interaction region (3; dash-dotted contour) downstream from, and close to the skimmer opening (2).

An electron emitter assembly is positioned further downstream within the skimmer body, that may represent a separate vacuum stage, and may comprise an annular filament (13) arranged concentrically around the first direction of the gas beam as well as an adapted toroidal repeller electrode-focusing lens assembly (14) that accelerates and directs the electrons (5) emitted by the filament (13) in the desired counter flow direction (second direction). Departing from the annular filament design, the filament assembly could also comprise a plurality of individual filaments with associated repeller electrode-focusing lens assemblies that symmetrically surround the gas beam direction as previously described. As before, filaments could also be replaced by other suitable electron emitters. In the example depicted, the filament assembly is located at an angle of about 28 degrees from the central axis, seen from the center of the interaction region (3). In other words, the first and second directions are aligned at about 152 degrees (upper side) and 208 degrees (lower side), respectively.

The electrons (5) emitted by the filament assembly are accelerated in a direction that is bound to intersect with the central axis which coincides with both the gas beam direction (first direction) and the magnetic axis. As before, however, the electrons (5) will eventually follow the curvature of the magnetic field lines in spiraling orbits, thereby being deflected in a direction substantially running counter to the gas beam. Once having reached the interaction region (3), the electrons (5) may interact with the gas molecules in the beam and bring about electron ionization. As before, the magnetic field line density shows a considerable gradient outside the magnet material so that, dependent on the electrons' energy, the electrons that have not interacted in the gas beam will ultimately reach a point of return in front of the skimmer opening (2) at which they will be reflected back whence they came ("magnetic bottle effect").

As has been exemplified before, sample gas ions generated by electron ionization in the interaction region (3) may be further transmitted downstream to a subsequent mass analyzer (not shown), see rightward pointing arrow (15), which may be located in the same vacuum stage within the skimmer confines as the interaction region (3) and the electron emitter assembly (13, 14).

Figure 8:
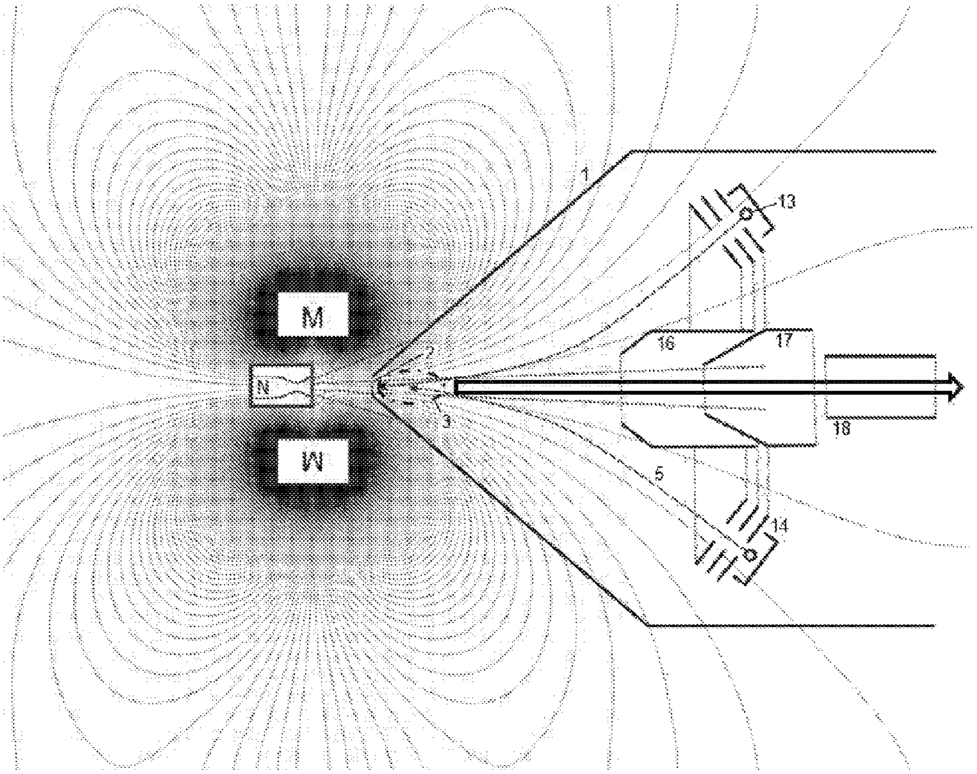
FIG. 8 shows schematically a yet further embodiment of a magnetically assisted electron impact ion source for mass spectrometry having a counter flow arrangement according to principles of the invention.

A yet further embodiment according to principles of the present invention is presented schematically in FIG. 8 and illustrates how the electrons (5) of a ring emitter (13) are accelerated by means of a toroidal repeller electrode-focusing lens assembly (14) along the dashed curve into the fringe field of the ring magnet M where they circulate around the field lines and ionize the sample gas molecules. Just outside the ring magnet M, the magnetic field forms a convergence, resembling a magnetic bottle; the electrons (5) are reflected and return within the sample gas beam. This creates additional opportunities for those electrons that have not interacted with sample gas molecules on their forward run “into the magnetic bottle”, to do so on their way back in the opposite direction.

In the axis of the ring magnet M, a nozzle N that may be connected via conduits to an end of a GC capillary (not shown) generates a sample gas beam running from left to right in the illustration. In a preferred embodiment a supersonic sample gas beam is generated by means of a de Laval-type constriction in the nozzle N as indicated. The lighter molecules of the sample gas leave the nozzle N in form of a larger cone, and are thus deflected by the skimmer (1) which separates the two stages of a differential pumping system in this example (pumps not shown). The ring filament (13) surrounds the sample gas beam within the skimmer body downstream from the interaction region (3; dash-dotted contour). The electrons (5) emitted are accelerated by about seventy volts towards the sample gas beam near the central opening (2) of the conical skimmer (1). Rotationally symmetric ion lenses (16), (17) and cylinder (18) can be foreseen to extract the ions and form an ion beam that is guided downstream to the mass analyzer (not illustrated). In the example depicted, the filament assembly is located at an angle of about 26 degrees from the central axis, seen from the center of the interaction region (3). In other words, the first and second directions are aligned at about 154 degrees (upper side) and 206 degrees (lower side), respectively.

As elaborated before, a skilled practitioner will recognize that, instead of the ring emitter (13), a single filament (straight or coil) positioned on a side of the gas beam, or a plurality of individual such filaments situated symmetrically around the beam could be used to match with the symmetry of a subsequent mass analyzer, such as a quadrupole mass analyzer. A plurality of two or more individual filaments could be used, being grouped in a polygon about the gas beam as exemplified in Panel C) of FIG. 6, for instance. As before, filaments could also be replaced by other electron emitting means, such as nanotube emitters.

Figure 9:
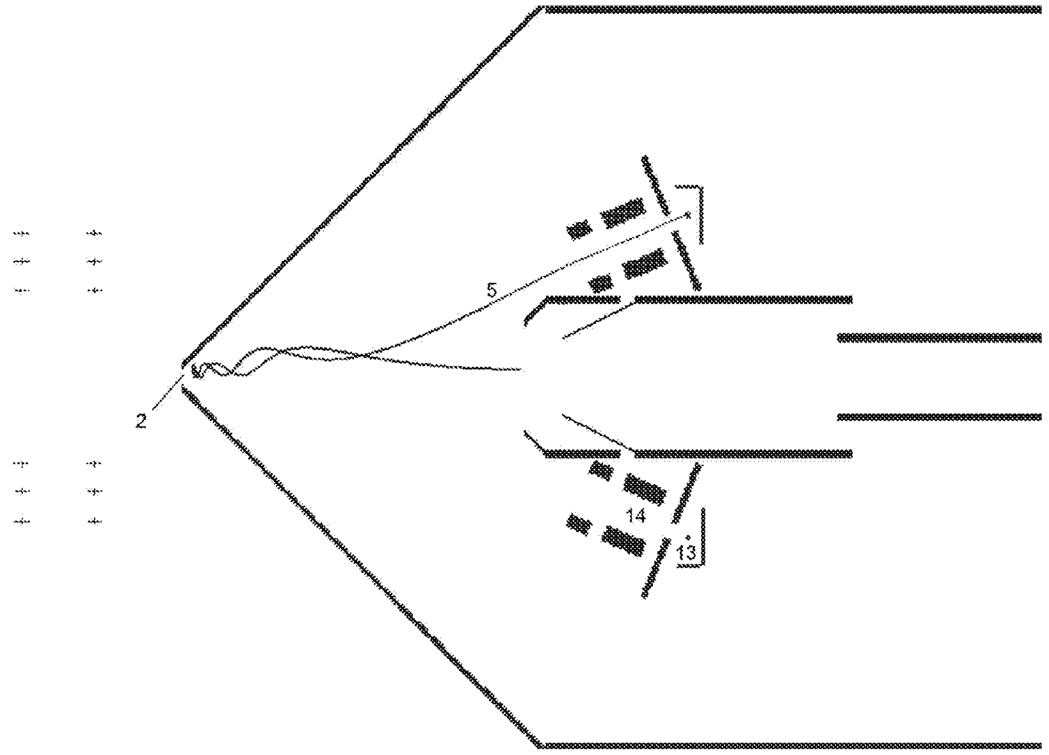
FIG. 9 shows a simulated electron trajectory in a magnetically assisted electron impact ion source for mass spectrometry having a counter flow arrangement according to principles of the invention.

FIG. 9 shows schematically a simple model of a rotationally symmetric magnetically assisted electron impact ion source in counter flow arrangement used for a SIMION® simulation of the trajectory of a single electron (5) from a position at a ring emitter (13) laterally offset from a central axis into the interaction region near the axis at the skimmer wall opening (2) and the ensuing back reflection in the “magnetic bottle”. The model elements are similar to those depicted in FIG. 8 but partly feature a slightly altered geometric design. For instance, the repeller electrode-focusing lens assembly (14) has an angled toroidal repeller electrode, a toroidal plate lens and two annular ion lenses. The permanent ring magnet’s dimensions are indicated by the group of crosses on the left hand side of the illustration in front of the skimmer opening (2). The trajectory of the electron (5) starting at the filament first proceeds almost linearly in a direction bound to intersect with the central axis and then transitions into alignment with the axis against an imaginary gas beam flow direction on a slightly undulating trajectory which is brought about by the geometric deflection into spiraling orbits around the magnetic field lines (not shown) due to the Lorentz force. Having reached a point close to the inner skimmer apex the forward motion of the electron (5) is stopped, though it may still circle around the local field lines, and then its backward motion begins which, in the particular example of a single electron depicted, runs largely parallel to the central axis and into the central cylindrical ion lenses. Generally, however, the backward motion of a plurality of reflected electrons will be quite divergent and can encompass wide angles in the plane of illustration and also outside thereof.

The invention has been shown and described above with reference to a number of different embodiments thereof. It will be understood, however, by a person skilled in the art that various aspects or details of the invention may be changed, or various aspects or details of different embodiments may be arbitrarily combined, if practicable, without departing from the scope of the invention. For example, the magnetically assisted electron impact ion source for mass spectrometry has been described as being particularly suited for GCMS applications, but it would also be possible to employ the principles thereof in other contexts of mass spectrometry. Further, reference has been made to electron emitter assemblies that include filaments, but it would be equally possible to employ other electron emitting devices, such as nanotube assemblies, as the skilled practitioner sees fit. Generally, the foregoing description is for the purpose of illustration only, and not for the purpose of limiting the invention which is defined solely by the appended claims, including any equivalent implementations, as the case may be.

What is claimed is:

1. A mass spectrometer having an electron impact ionization source, comprising:

an ejector for forming a beam of sample gas being driven in a first direction through an interaction region;

a magnet assembly configured and arranged such that its magnetic field lines pass through the interaction region substantially parallel to the first direction;

an electron emitter assembly for directing electrons toward the interaction region in a second direction being aligned substantially opposite to the first direction, wherein the electrons propagate along and are confined about the magnetic field lines until reaching the interaction region and forming sample gas ions therein; and a mass analyzer located downstream from the interaction region to which the sample gas ions are guided for mass analysis.

2. The mass spectrometer of claim 1, wherein opposite alignment of the first direction and second direction encompasses angles between about 120 degrees and 240 degrees.

3. The mass spectrometer of claim 1, wherein the ejector and the electron emitter assembly are located at opposite sides of the interaction region along the first direction.

4. The mass spectrometer of claim 1, wherein the magnet assembly has an annular shape and is disposed concentrically about the ejector.

5. The mass spectrometer of claim 4, wherein the magnet assembly comprises an annular permanent magnet that is magnetized radially.

6. The mass spectrometer of claim 4, wherein the magnet assembly comprises a plurality of axially magnetized permanent magnets that are arranged concentrically in a hub-and-spikes pattern around the ejector.

7. The mass spectrometer of claim 4, wherein the interaction region is located in a fringe field of the magnet assembly.

8. The mass spectrometer of claim 4, wherein the magnet assembly is designed and configured such that its magnetic field lines converge in the interaction region against the first direction to establish a magnetic bottle effect that reflects the incoming electrons.

9. The mass spectrometer of claim 1, wherein the magnet assembly comprises an axially magnetized magnet that is located behind, and aligned coaxially with, the ejector.

10. The mass spectrometer of claim 1, further comprising a wall separating different vacuum stages between the ejector and the interaction region, the wall having an opening that is located substantially opposite the ejector.

11. The mass spectrometer of claim 10, wherein the wall comprises a conical skimmer having an apertured apex that is pointing toward the ejector.

12. The mass spectrometer of claim 1, wherein the electron emitter assembly comprises a filament ring or coil and a repeller electrode-focusing lens assembly dimensionally adapted thereto, both the filament ring or coil and the repeller electrode-focusing lens assembly being disposed concentrically about the first direction.

13. The mass spectrometer of claim 1, wherein the electron emitter assembly comprises one or more filaments and associated repeller electrode-focusing lens assemblies being located laterally displaced from the first direction.

14. The mass spectrometer of claim 1, wherein the ejector comprises one of a nozzle and an aperture.

15. The mass spectrometer of claim 14, wherein the nozzle is configured to generate a supersonic beam of sample gas.

16. The mass spectrometer of claim 1, wherein the ejector is coupled upstream to an output of a gas chromatograph.

17. The mass spectrometer of claim 1, wherein the mass analyzer is taken from the group comprising quadrupole mass filters, triple-quadrupole mass analyzers, ion trap mass analyzers, time-of-flight mass analyzers, and Fourier Transform mass analyzers.

18. The mass spectrometer of claim 1, further comprising a radio frequency ion guide or ion funnel located between the interaction region and the mass analyzer for guiding the sample gas ions to the mass analyzer.

19. The mass spectrometer of claim 1, further comprising an interface between the interaction region and the mass analyzer.

* * * * *